(12) United States Patent
Wu et al.

(10) Patent No.: US 12,443,759 B2
(45) Date of Patent: Oct. 14, 2025

(54) CIPHER ACCELERATOR AND METHOD FOR TAMPER PROTECTION IN CRYPTOGRAPHIC OPERATIONS

(71) Applicant: Nuvoton Technology Corporation, Hsinchu Science Park (TW)

(72) Inventors: Kun-Yi Wu, Tainan (TW); Yu-Shan Li, Tainan (TW)

(73) Assignee: NUVOTON TECHNOLOGY CORPORATION, Hsinchu Science Park (TW)

(*) Notice: Subject to any disclaimer, the term of this patent is extended or adjusted under 35 U.S.C. 154(b) by 85 days.

(21) Appl. No.: 18/460,899

(22) Filed: Sep. 5, 2023

(65) Prior Publication Data
US 2024/0078345 A1 Mar. 7, 2024

(30) Foreign Application Priority Data
Sep. 6, 2022 (TW) .................................. 111133629

(51) Int. Cl.
G06F 21/00 (2013.01)
G06F 21/72 (2013.01)
H04L 9/06 (2006.01)

(52) U.S. Cl.
CPC .............. *G06F 21/72* (2013.01); *H04L 9/065* (2013.01)

(58) Field of Classification Search
CPC ......... G06F 21/72; H04L 9/065; H04L 9/002; H04L 9/0869; H04L 2209/08; H04L 2209/12
See application file for complete search history.

(56) References Cited

U.S. PATENT DOCUMENTS 4,583,224 A * 4/1986 Ishii .......................... H04L 1/22
714/10
4,627,954 A * 12/1986 Leroy .................... G21C 17/10
376/217

(Continued)

FOREIGN PATENT DOCUMENTS

| CN | 111555862 A | 8/2020 |
| EP | 2720402 A1 | 4/2014 |
| TW | 201904228 A | 1/2019 |

OTHER PUBLICATIONS

Renjie Zhu et al. "Fault Attack of SMS4 Based on Internal Collisions", 2020 Journal of Physics: Conference Series 1486, (2020), 8 pgs. IOP Publishing.

*Primary Examiner* — Don G Zhao
(74) *Attorney, Agent, or Firm* — Muncy, Geissler, Olds & Lowe, P.C.

(57) ABSTRACT

A method for tamper protection in cryptographic calculations is provided. A cryptographic calculation includes a plurality of normal rounds and a plurality of redundant rounds. The method includes obtaining a first variable x and a second variable y using a random number generator; dividing the normal rounds into a first normal section and a second normal section, and dividing the redundant rounds into a first redundant section and a second redundant section according to the first variable x and the second variable y; executing the first normal section and the first redundant section in sequence using a clock signal; in response to completion of the first redundant section and a first calculation result of the first normal section and a second calculation result of the first redundant section being the same, executing the second normal section and the second redundant section in sequence to complete the cryptographic calculation.

10 Claims, 8 Drawing Sheets

(56) References Cited

U.S. PATENT DOCUMENTS

| | | | | |
|---|---|---|---|---|
| 5,016,249 A * | 5/1991 | Hurst | | G06F 11/076 714/24 |
| 5,579,265 A * | 11/1996 | Devin | | G11C 29/24 365/201 |
| 5,774,646 A * | 6/1998 | Pezzini | | G11C 29/70 714/42 |
| 6,067,262 A * | 5/2000 | Irrinki | | G11C 29/12 365/201 |
| 6,278,784 B1 * | 8/2001 | Ledermann | | H04S 1/007 |
| 6,691,257 B1 * | 2/2004 | Suffin | | G06F 11/2007 714/43 |
| 7,149,921 B1 * | 12/2006 | Zorian | | G11C 29/72 714/30 |
| 8,244,405 B2 * | 8/2012 | Kao | | G05B 15/02 700/286 |
| 9,418,245 B2 * | 8/2016 | Shibutani | | H04L 9/0631 |
| 2001/0009523 A1 * | 7/2001 | Maeno | | G11C 29/50 365/201 |
| 2002/0042893 A1 * | 4/2002 | Larson | | G06F 11/1044 714/E11.085 |
| 2002/0061606 A1 * | 5/2002 | Honma | | G11C 29/006 438/14 |
| 2002/0136066 A1 * | 9/2002 | Huang | | G11C 29/24 365/200 |
| 2005/0111363 A1 * | 5/2005 | Snelgrove | | H04M 15/805 370/230 |
| 2005/0165573 A1 * | 7/2005 | Takamiya | | G01R 31/31709 702/127 |
| 2005/0179576 A1 * | 8/2005 | Tarui | | G01R 19/257 341/155 |
| 2007/0014395 A1 * | 1/2007 | Joshi | | H04L 9/004 380/28 |
| 2007/0198829 A1 * | 8/2007 | McGrew | | H04L 67/02 713/155 |
| 2007/0288743 A1 * | 12/2007 | Cam-Winget | | H04L 9/0841 713/150 |
| 2010/0083205 A1 * | 4/2010 | Ono | | G06F 30/3312 716/113 |
| 2010/0100799 A1 * | 4/2010 | Kurachi | | G05B 9/03 714/E11.024 |
| 2010/0268935 A1 * | 10/2010 | Rodgers | | H04L 63/164 713/153 |
| 2013/0020872 A1 * | 1/2013 | Kinnard | | G06F 1/263 307/64 |
| 2014/0301184 A1 * | 10/2014 | Aoki | | H04L 12/413 370/220 |
| 2015/0033101 A1 * | 1/2015 | Chebruch | | G06F 1/04 714/798 |
| 2015/0074159 A1 * | 3/2015 | Poschmann | | G06F 21/755 708/270 |
| 2016/0072621 A1 * | 3/2016 | Oshida | | G06F 21/554 713/194 |
| 2016/0127123 A1 * | 5/2016 | Johnson | | H04L 9/003 713/189 |
| 2016/0315764 A1 * | 10/2016 | Willemse | | G06F 11/0736 |
| 2017/0139850 A1 * | 5/2017 | Yoon | | G06F 15/167 |
| 2019/0294486 A1 * | 9/2019 | Cheriton | | G06F 11/079 |
| 2019/0386815 A1 * | 12/2019 | Satpathy | | G05B 7/724 |
| 2020/0044822 A1 * | 2/2020 | Kotha | | H04L 9/0631 |
| 2020/0210076 A1 * | 7/2020 | Murphy | | G06F 21/30 |
| 2020/0310394 A1 * | 10/2020 | Wouhaybi | | H04L 67/1051 |
| 2020/0394176 A1 * | 12/2020 | Wu | | G06F 16/22 |
| 2022/0103339 A1 * | 3/2022 | Brooker | | H04L 9/0637 |
| 2022/0129545 A1 * | 4/2022 | Lim | | G06F 21/602 |
| 2022/0172753 A1 * | 6/2022 | Lim | | G11C 7/1063 |
| 2022/0180003 A1 * | 6/2022 | Tehranipoor | | G06F 30/3308 |
| 2022/0309190 A1 * | 9/2022 | Gopal | | H04L 9/0643 |
| 2022/0407679 A1 | 12/2022 | Chen | | |
| 2023/0069351 A1 * | 3/2023 | Fujiwara | | G11C 29/12015 |
| 2023/0216677 A1 | 7/2023 | Wu et al. | | |
| 2023/0350746 A1 * | 11/2023 | Huang | | G06F 11/0724 |
| 2023/0412356 A1 * | 12/2023 | Cooreman | | H04L 9/004 |
| 2024/0078345 A1 * | 3/2024 | Wu | | G06F 21/72 |

\* cited by examiner

CIPHER ACCELERATOR AND METHOD FOR TAMPER PROTECTION IN CRYPTOGRAPHIC OPERATIONS

CROSS REFERENCE TO RELATED APPLICATIONS

This Application claims priority of Taiwan Patent Application No. 111133629, filed on Sep. 6, 2022, the entirety of which is incorporated by reference herein.

BACKGROUND OF THE INVENTION

Field of the Invention

The present invention relates to a cipher accelerator, and, in particular, to a cipher accelerator which executes differential fault analysis and a method for tamper protection in cryptographic operations.

Description of the Related Art

In recent years, cryptographic applications have been widely used in various electronic products, and cryptographic applications attach great importance to protecting confidential information so as to prevent calculation data from being analyzed and stolen.

In the cryptographic process (the process of encryption and decryption), some transistors of the integrated circuit can be influenced to generate wrong outputs through a Voltage Glitch Attack, which involves inputting fast-changing data into an integrated circuit. This causes the processor to operate incorrectly, or to process the wrong data. Also, the information hidden in the integrated circuit may leak as errors occur in the processor.

Therefore, analyzing whether the data during operation/calculation is being attacked is one of the problems to be solved in the cryptographic application (the application of encryption and decryption).

BRIEF SUMMARY OF THE INVENTION

A cipher accelerator, according to a certain embodiment of the present invention, comprises a cryptographic circuit, a controller, a first memory, and a second memory. The cryptographic circuit is configured to execute a cryptographic calculation according to a control signal. The cryptographic calculation includes a plurality of normal rounds and a plurality of redundant rounds. The controller is configured to provide the control signal to the cryptographic circuit, according to a first variable x and a second variable y, to control the sequence in which the cryptographic circuit executes the normal rounds and the redundant rounds. The first variable x and the second variable y are positive integers. The first memory is configured to store the state of execution of the normal rounds. The second memory is configured to store the state of execution of the redundant rounds. The cryptographic circuit divides the plurality of normal rounds into a first normal section and a second normal section according to the first variable x, and it divides the plurality of redundant rounds into a first redundant section and a second redundant section according to the first variable x and the second variable y, The cryptographic circuit executes the first normal section and the first redundant section in sequence using a clock signal. When the first redundant section is completed, and when the first calculation result of the first normal section and the second calculation result of the first redundant section are the same, the cryptographic circuit executes the second normal section and the second redundant section in sequence to complete the cryptographic calculation.

According to some embodiments of the present invention, the end time of the first normal section is the x-th clock cycle of the clock signal, and the end time of the first redundant section is the 2x-th clock cycle of the clock signal.

According to some embodiments of the present invention, there is a first amount z of normal rounds, and the end time of the normal rounds is the (z+x)-th clock cycle of the clock signal. The end time of the redundant rounds is the (z+x+y)-th clock cycle of the clock signal, and z is a positive integer.

According to some embodiments of the present invention, in response to the cryptographic circuit completing the second redundant section, the cryptographic circuit determines whether the third calculation result of the second normal section is the same as the fourth calculation result of the second redundant section. In response to the cryptographic circuit determining that the third calculation result of the second normal section is the same as the fourth calculation result of the second redundant section, the cryptographic circuit determines that the cryptographic calculation is successful, and reports the third calculation result as the cryptographic result of the cryptographic calculation. In response to the cryptographic circuit determining that the third calculation result of the second normal section is different from the fourth calculation result of the second redundant section, the cryptographic circuit clears the cryptographic result of the cryptographic calculation and resets it to 0.

The present invention further provides a method for tamper protection in cryptographic calculations, wherein a cryptographic calculation includes a plurality of normal rounds and a plurality of redundant rounds. The method comprises: obtaining a first variable x and a second variable y by a random number generator, wherein the first variable x and the second variable y are positive integers; dividing the plurality of normal rounds into a first normal section and a second normal section according to the first variable x, and dividing the plurality of redundant rounds into a first redundant section and a second redundant section according to the first variable x and the second variable y; executing in sequence the first normal section and the first redundant section using a clock signal; and in response to completion of the first redundant section, and the first calculation result of the first normal section and the second calculation result of the first redundant section being the same, executing the second normal section and the second redundant section in sequence to complete the cryptographic calculation.

According to some embodiments of the present invention, the end time of the first normal section is the x-th clock cycle of the clock signal, and the end time of the first redundant section is the 2x-th clock cycle of the clock signal.

According to some embodiments of the present invention, there is a first amount z of normal rounds, and the end time of the normal rounds is the (z+x)-th clock cycle of the clock signal. The end time of the redundant rounds is the (z+x+y)-th clock cycle of the clock signal, and z is a positive integer.

According to some embodiments of the present invention, the method further comprises determining whether the third calculation result of the second normal section is the same as the fourth calculation result of the second redundant section in response to the cryptographic circuit completing the second redundant section.

According to some embodiments of the present invention, the method further comprises the following steps. In response to the third calculation result of the second normal section being the same as the fourth calculation result of the second redundant section, the cryptographic calculation is determined to have been successful, and the third calculation result is reported as the cryptographic result of the cryptographic calculation. In response to the third calculation result of the second normal section being different from the fourth calculation result of the second redundant section, the cryptographic result of the cryptographic calculation is cleared and reset to 0.

DETAILED DESCRIPTION OF THE INVENTION

In order to make the above-mentioned and other objects, features, and advantages of the present invention more obvious and easy to understand, preferred embodiments are enumerated below, and described in detail in conjunction with the accompanying drawings, as follows.

Figure 1:
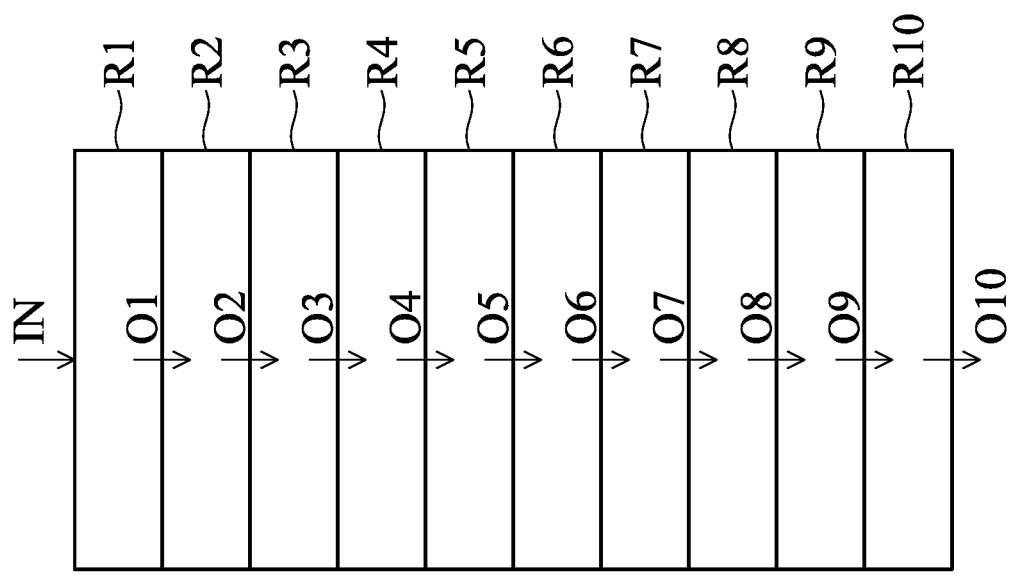
FIG. 1 is a schematic diagram of executing a cryptographic algorithm according to some embodiments of the present invention.

FIG. 1 is a schematic diagram of executing a cryptographic algorithm (encryption/decryption algorithm) according to some embodiments of the present invention. In some embodiments, the cryptographic algorithm may be the Advanced Encryption Standard (AES) algorithm, which is the most widely analyzed and widely used algorithm today. In some embodiments, the cryptographic algorithm may be the ChaCha algorithm. In some embodiments, the cryptographic algorithm may be the SM4 block cipher algorithm.

In FIG. 1, the cryptographic algorithm will execute multiple rounds. Also, for every round, same or similar operations are executed to the state of a previous round by the same circuit. In FIG. 1, the cryptographic algorithm executes 10 rounds R1~R10. First, according to input data IN, a first round R1 is executed to obtain a calculation result O1. Then, the calculation result O1 of the first round R1 will be substituted into the second round R2 for calculation to obtain the output O2. Then, the calculation result O2 of the second round R2 will be substituted into the third round R3 for calculation to obtain the output O3 which is substituted into the fourth round R4, and so on. The fourth round R4 to the tenth round R10 are executed in sequence, thereby respectively generating the calculation result O4 to the calculation result O10.

In the process that an integrated circuit executes the cryptographic (encryption/decryption) operations, whether the cryptographic process suffers malicious attack or not, for example the Voltage Glitch Attack, can be determined by executing the differential fault analysis through normal rounds R1~R10 and redundant rounds R1~R10. First, execute the normal rounds R1~R10 (hereinafter is referred to as NR1~NR10) according to the initial state of the input data, and obtain the calculation result NO10 generated from the normal round NR10. Then, execute the redundant rounds R1~R10 (hereinafter is referred to as RR1~RR10) according to the initial state of the input data, and obtain the calculation result RO10 generated from the redundant round RR10. Note that the operation in each of the redundant rounds RR is the same as the respective corresponding normal round NR.

Then, determine whether the normal-round calculation result NO10, and the redundant-round calculation result RO10 are the same. If the normal-round calculation result NO10 is consistent with the redundant-round calculation result RO10, it means that the cryptographic calculations have not failed, i.e., the cryptographic process is not under attack, and the normal-round calculation result NO10 can be delivered to other circuits for executing the subsequent operations. On the contrary, if the normal-round calculation result NO10 is different form the redundant-round calculation result RO10, it means that the cryptographic calculations have failed, i.e., the cryptographic process is under attack. Then, the integrated circuit re-executes the normal rounds NR1~NR10 and the redundant rounds RR1~RR10, until the normal-round calculation result NO10 is consistent with the redundant-round calculation result RO10. In some embodiments, when the normal-round calculation result NO10 is different from the redundant-round result RO10, the integrated circuit will end the cryptographic calculations directly, and notify to other circuits that the cryptographic process is under attack and the operation has failed.

Figure 2:
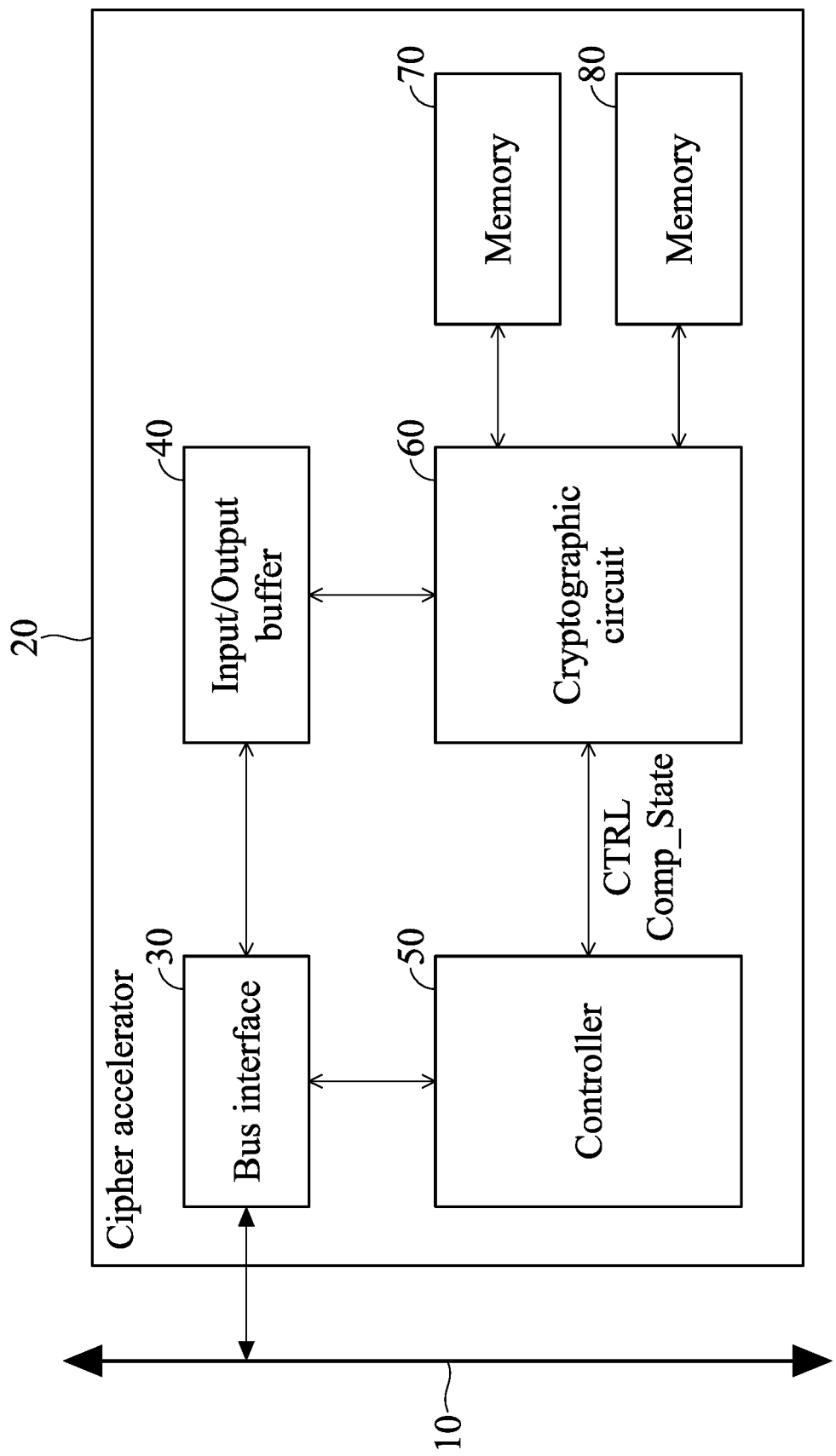
FIG. 2 shows a cipher accelerator according to some embodiments of the present invention.

FIG. 2 shows a cipher accelerator 20 according to some embodiment of the present invention. The cipher accelerator 20 is implemented in the integrated circuit, and configured to encrypt/decrypt the data from other circuits via the bus, and to transmit the encrypted/decrypted data to the original circuit or other circuits.

The cipher accelerator 20 includes a bus interface 30, an input/output buffer 40, a controller 50, a cryptographic circuit 60 (or known as an encryption/decryption circuit), a memory 70, and a memory 80. In some embodiments, the memory 70 and the memory 80, for example, are volatile memory, non-volatile memory, or register, but the present invention is not limited thereto. The bus interface 30 is coupled to the bus 10. The bus interface 30 can transmit the commands from the other circuits to the controller 50, and can transmit the response provided from the controller 50 to the bus 10. In addition, the bus interface 30 can transmit the data to be encrypted or decrypted to the input/output buffer 40, and transmit the encrypted or decrypted data from the input/output buffer 40 to the bus 10.

In response to the commands from the bus interface 30, the controller 50 provides a control signal to the cryptographic circuit 60, and the control signal CTRL includes finite-state-machine (FSM) information related to cryptographic operations. In some embodiments, the controller 50 can provide the control signal CTRL which has the finite-state-machine information corresponding to a normal mode, or has the finite-state-machine information corresponding to a differential fault analysis mode, to the cryptographic circuit 60.

In the normal mode, the control signal CTRL only instructs the cryptographic circuit 60 to execute the normal cryptographic calculation instead of the redundant cryptographic calculation, that is, the cryptographic circuit 60 only executes normal rounds NR. Therefore, after completion of the normal rounds NR, the cryptographic circuit 60 will obtain the encrypted/decrypted data, and transmit the encrypted/decrypted data to the input/output buffer 40. Then, the encrypted/decrypted data is provided to the bus 10 via the bus interface 30, for the other circuits to execute subsequent procedures.

In the differential fault analysis mode, in addition to normal cryptographic calculation, the control signal CTRL further instructs the cryptographic circuit 60 to execute redundant cryptographic calculation, that is, the cryptographic circuit 60 further executes the redundant rounds RR. After completing the normal cryptographic calculation and the redundant cryptographic calculation, the cryptographic circuit 60 compares the results of these two calculations to determine whether the calculation results of the normal cryptographic calculation and the redundant cryptographic calculation are consistent. If the calculation results of the normal cryptographic calculation and the redundant cryptographic calculation are inconsistent, the cryptographic circuit 60 provides a signal Comp_State to the controller 50 to notify a failure has occurred. On the contrary, if the calculation results of the normal cryptographic calculation and the redundant cryptographic calculation are the same, the cryptographic circuit 60 transmits the encrypted/decrypted data to the input/output buffer 40. Consequently, the encrypted/decrypted data are provided to the bus 10 via the bus interface 30, for the subsequent procedures executed by the other circuits.

In the differential fault analysis mode, the result (cryptographic state), generated during the normal cryptographic calculation executed by the cipher accelerator 20, is stored in the memory 70, and the result (cryptographic state), generated during the redundant cryptographic calculation executed by the cipher accelerator 20, is stored in the memory 80. That is, when the cipher accelerator 20 operates to determine whether the calculation results of the normal cryptographic calculation and the redundant cryptographic calculation are consistent, the cipher accelerator 20 can read the calculation result of the normal cryptographic calculation stored in the memory 70, and the calculation result of the redundant cryptographic calculation stored in the memory 80 for comparison. In addition, the required number (or amount) of the redundant rounds RR for executing the redundant cryptographic calculation is less than the required number of the normal rounds NR for executing the normal cryptographic calculation. In other words, the required time (i.e., the number of the clock cycles) for executing the redundant cryptographic calculation is less than the required time (the number of the clock cycles) for executing the normal cryptographic calculation. Accordingly, using the cipher accelerator 20 can speed up the operation of the differential fault analysis, and reduce the required analysis time.

Figure 3:
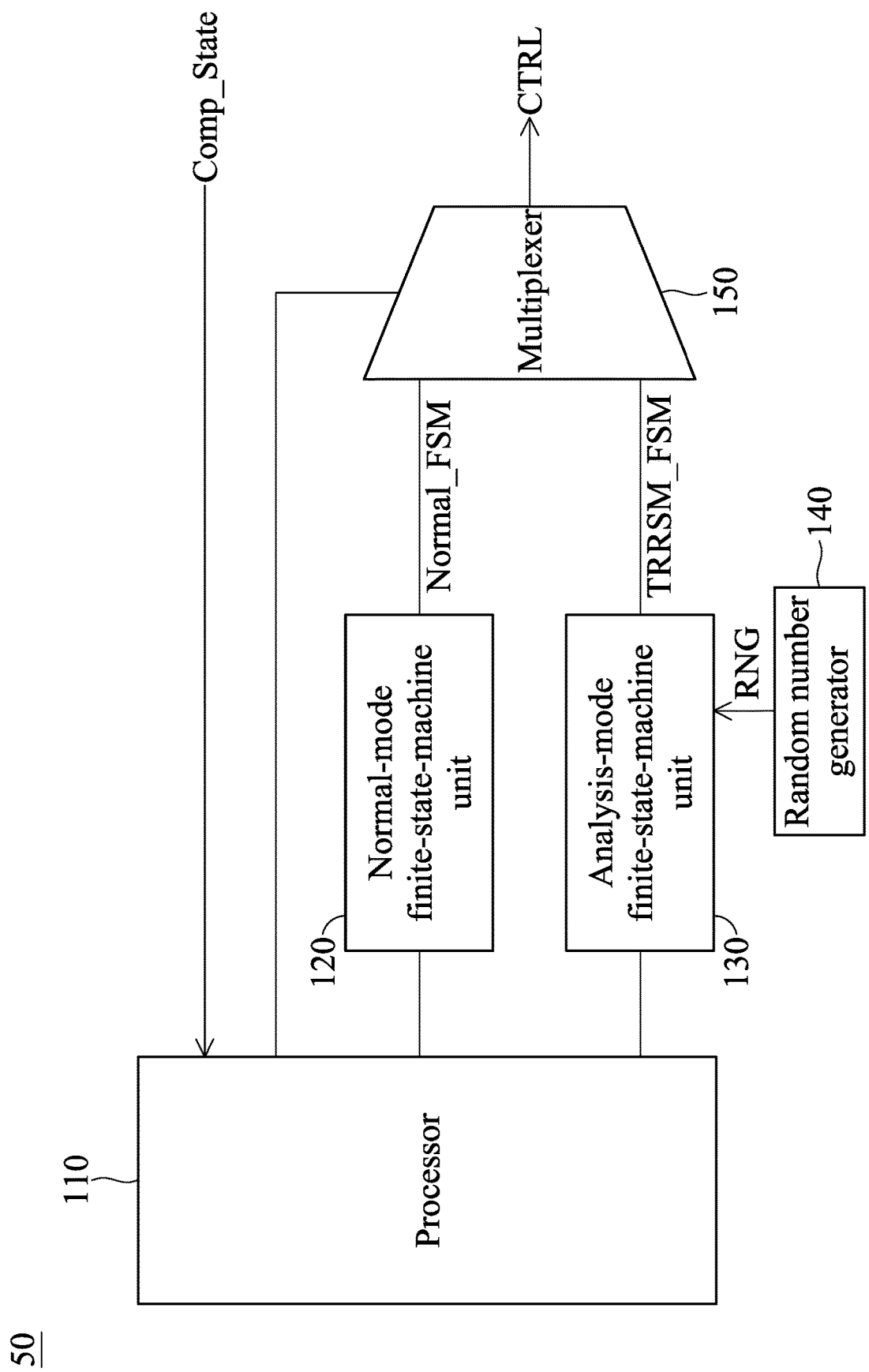
FIG. 3 shows a controller of the FIG. 2 according to some embodiments of the present invention.

FIG. 3 shows a controller 50 of the FIG. 2 according to some embodiments of the present invention. The controller 50 includes a multiplexer (MUX) 150, a processor 110, a normal-mode finite-state-machine unit 120, an analysis-mode finite-state-machine unit 130, and a random number generator 140. In FIG. 3, only relevant circuits of the controller 50 are described, while other circuits will be omitted.

In the normal mode, the processor 110 controls the normal-mode finite-state-machine unit 120 to generate finite-state-machine information Normal_FSM corresponding to the normal cryptographic calculation. In addition, in the differential fault analysis mode, the processor 110 controls the analysis-mode finite-state-machine unit 130 to generate finite-state-machine information TRR_FSM corresponding to the normal cryptographic calculation combined with the redundant cryptographic calculation. Significantly, the analysis-mode finite-state-machine unit 130 provides the finite-state-machine information TRRSM_FSM according to a random variable RNG from the random number generator 140. Furthermore, the required number (amount) of the redundant rounds RR for executing the redundant calculation is determined by the random variable RNG (for example, may include a first variable x and/or a second variable y). In other words, the required number of the redundant rounds RR for executing each redundant cryptographic calculation is changeable.

Refer to both FIG. 2 and FIG. 3. In the normal mode, the processor 110 controls the multiplexer 150 to select the finite-state-machine information Normal_FSM from the normal-mode finite-state-machine unit 120 as the control signal CTRL. Also, in the differential fault analysis mode, the processor 110 controls the multiplexer 150 to select the finite-state-machine information TRRSM_FSM from the analysis-mode finite-state-machine unit 130 as the control signal CTRL.

As mentioned before, in the differential fault analysis mode, the cryptographic circuit 60 determines whether the calculation results of the normal cryptographic calculation and the redundant calculation are consistent, and provides the signal Comp_State to the controller 50 to notify the controller 50 whether a failure has occurred. When the signal Comp_State indicates that the failure has occurred, the processor 110 controls the analysis-mode finite-state-machine unit 130 to re-generate the finite-state-machine information TRRSM_FSM, so as to control the cryptographic circuit 60 to re-execute the normal cryptographic calculation and the redundant cryptographic calculation. In some embodiments, when the signal Comp_State indicates that the failure has occurred, the processor 110 will directly end the cryptographic calculation, and notify other circuits (for example, by transmitting a specific value) that the cryptographic process is attacked, and the cryptographic calculation fails.

Figure 4:
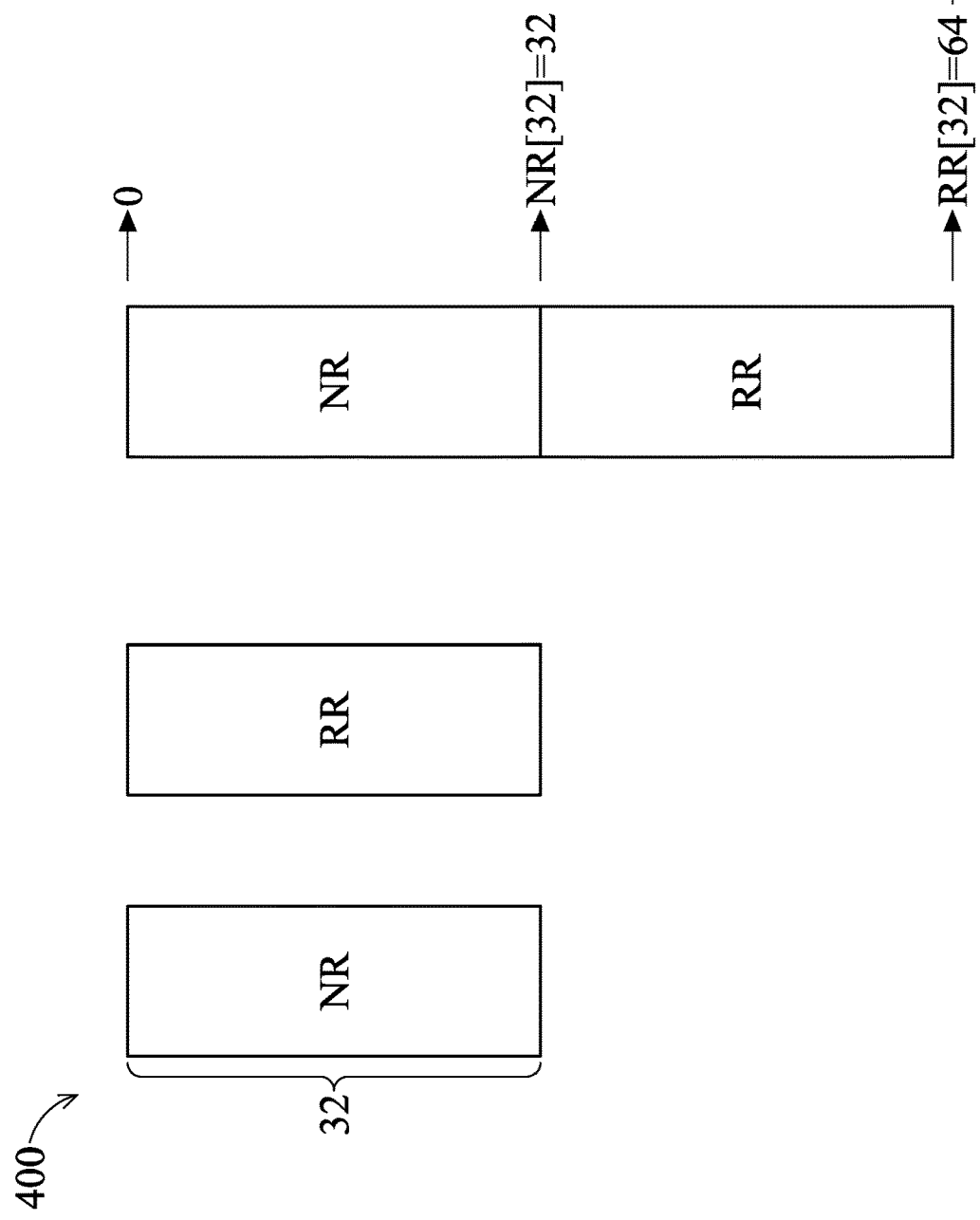
FIG. 4 is a schematic diagram of using a conventional time-redundant inspection mechanism.

FIG. 4 is a schematic diagram of using a conventional time-redundant inspection mechanism. Please also refer to both FIG. 3 and FIG. 4.

In the conventional time-redundant inspection mechanism 400 of FIG. 4, for illustrative purposes, assumed that both the number of the normal rounds NR and the number of the redundant rounds RR are 32, and executing one normal round or one redundant round takes a clock cycle. First, the cipher accelerator 20 sets the cryptographic states of the normal rounds NR and the redundant rounds RR to an initial state. Then, the cipher accelerator 20 first executes and completes 32 normal rounds NR, and switches to the cryptographic state of the redundant rounds RR, and executes 32 redundant rounds RR from the beginning. At last, the cipher accelerator 20 detects or checks whether the cryptographic states of the normal rounds NR and the redundant rounds RR are the same. If the cipher accelerator 20 determines that the cryptographic states of the normal rounds NR and the redundant rounds RR are different, it means that an unknown failure has occurred during the cryptographic process, so the cipher accelerator 20 will clear the cryptographic result to "0".

Figure 5:
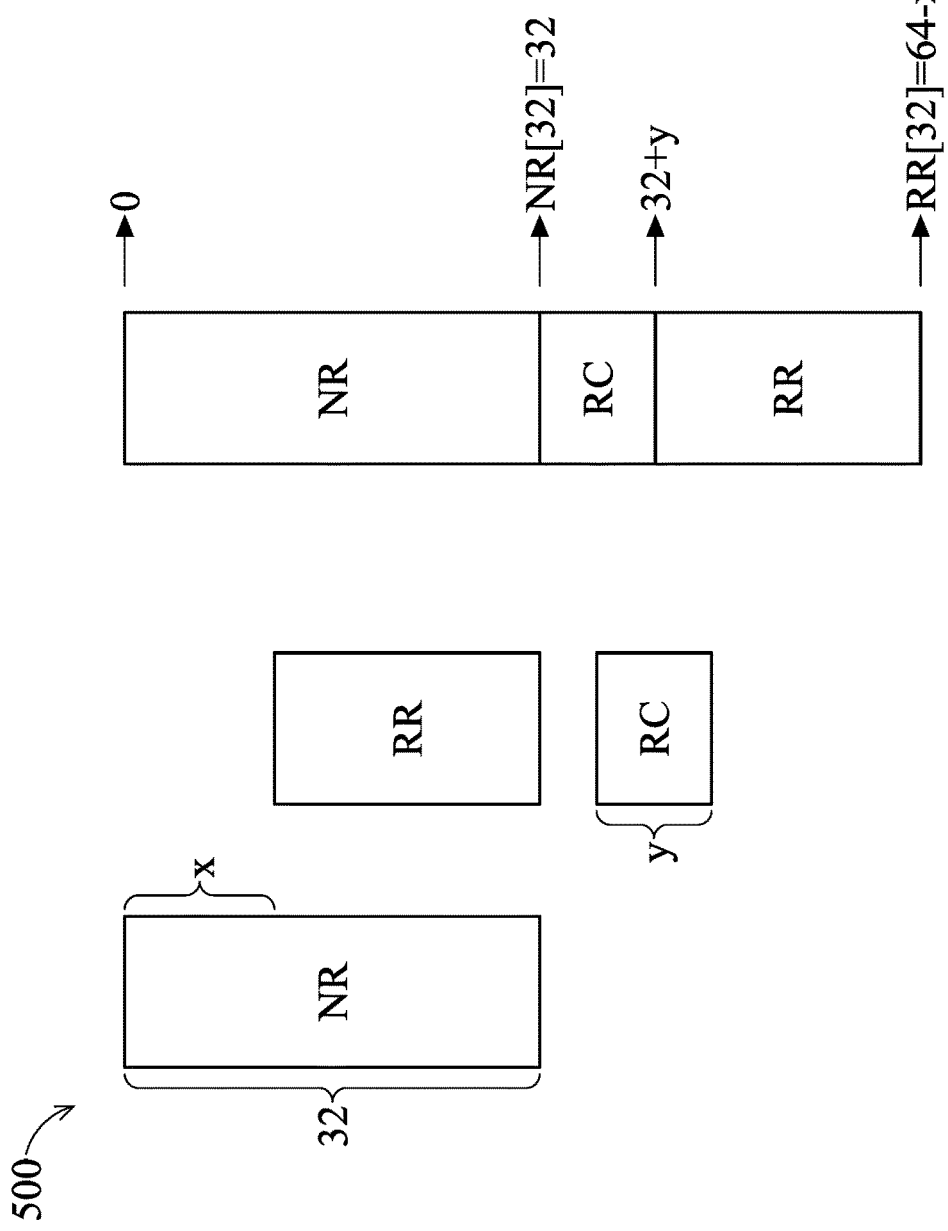
FIG. 5 is a schematic diagram of executing the time-redundant inspection mechanism according to one embodiment of the present invention.

FIG. 5 is a schematic diagram of executing the time-redundant inspection mechanism according to one embodiment of the present invention. Please also refer to both FIG. 3 and FIG. 5.

For illustrative purposes, assumed that the number of the normal rounds NR in FIG. 5 is 32, that is, the cryptographic calculation executes normal rounds NR1~NR32. When the total number of the normal rounds NR is 32, the first variable x may be a random integer between 1 and 27. First, the cipher accelerator 20 sets the cryptographic state of the normal rounds NR to an initial state, and starts the operation of the normal rounds NR. When the normal rounds NR are executed to the x-th clock cycle (i.e., the x-th round), the cipher accelerator 20 copies the cryptographic state of the normal rounds NR to the cryptographic state of the redundant rounds RR. When completing the 32 normal rounds NR, the cipher accelerator 20 starts to execute y random cycles RC. After completion of the y random cycles RC, the cipher accelerator 20 starts to execute the operation of the redundant rounds RR. Because the cryptographic state of the redundant rounds RR is the cryptographic state of the normal rounds NR at the x-th clock cycle, so the cipher accelerator 20 only executes the redundant rounds RR of (32−x) clock cycles, i.e., executing (32−x) redundant rounds RR. Consequently, the redundant rounds RR will end at the (64−x+y)-th clock cycle.

Figure 6:
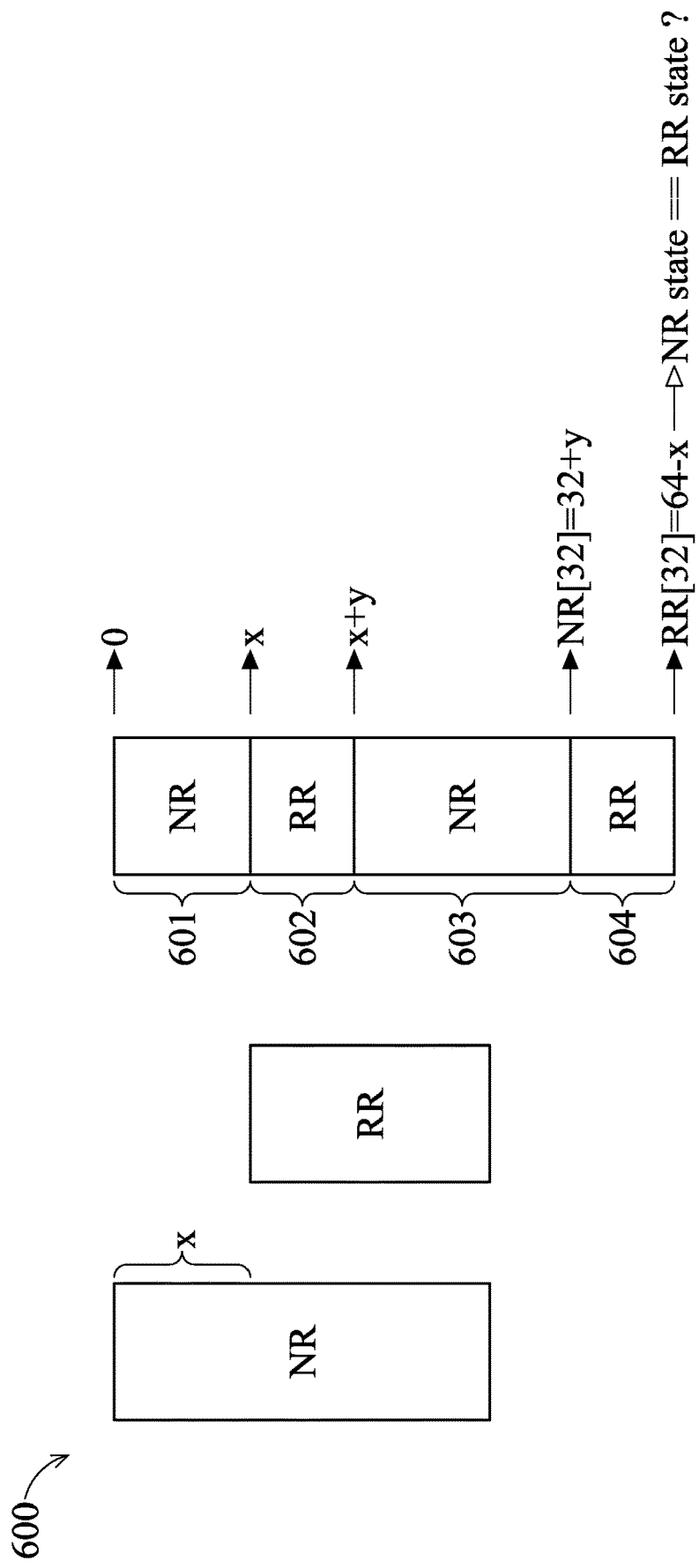
FIG. 6 is a schematic diagram of executing the time-redundant inspection mechanism according to another embodiment of the present invention.

FIG. 6 is a schematic diagram of executing the time-redundant inspection mechanism according to another embodiment of the present invention. Please refer to FIG. 3 and FIG. 6 at the same time.

In this embodiment, the cipher accelerator 20 sets a first variable x and a second variable y, and both the first variable x and the second variable y are random integers. When the total number of the normal rounds NR is 32, the first variable x may be the random integer between 1 and 27, and the second variable y may be the random integer between 0 and (32−x). First, the cipher accelerator 20 sets the state of the normal rounds NR to an initial state, and starts to execute the operation of the normal rounds NR. When the normal rounds NR are executed to the x-th clock cycle, i.e., the x-th round, the cipher accelerator 20 copies the cryptographic state of the normal rounds NR to the cryptographic state of the redundant rounds RR. Then, the cipher accelerator 20 switches to the cryptographic state of the redundant rounds RR, and executes the operation of the redundant rounds RR until the (x+y)-th clock cycle. The normal rounds NR in the range 601, for example corresponding to the first clock cycle to the x-th clock cycle, may be referred to as, for example a first normal section, and the redundant rounds RR in the range 602, for example corresponding to the (x+1)-th clock cycle to the (x+y)-th clock cycle, may be referred to as, for example a first redundant section.

Next, the cipher accelerator 20 switches again to the cryptographic state of the normal rounds NR, and completes the operation of the remaining normal rounds NR. The cryptographic accelerator 20 completes the operation. The cipher accelerator 20 completes the remaining normal rounds NR at the (32+y)-th clock cycle, and then switches to the cryptographic state of the redundant rounds RR and completes the operation of the remaining redundant rounds RR, that is, the operation of the remaining redundant rounds RR is completed at the (64−x)-th clock cycle.

Figure 7:
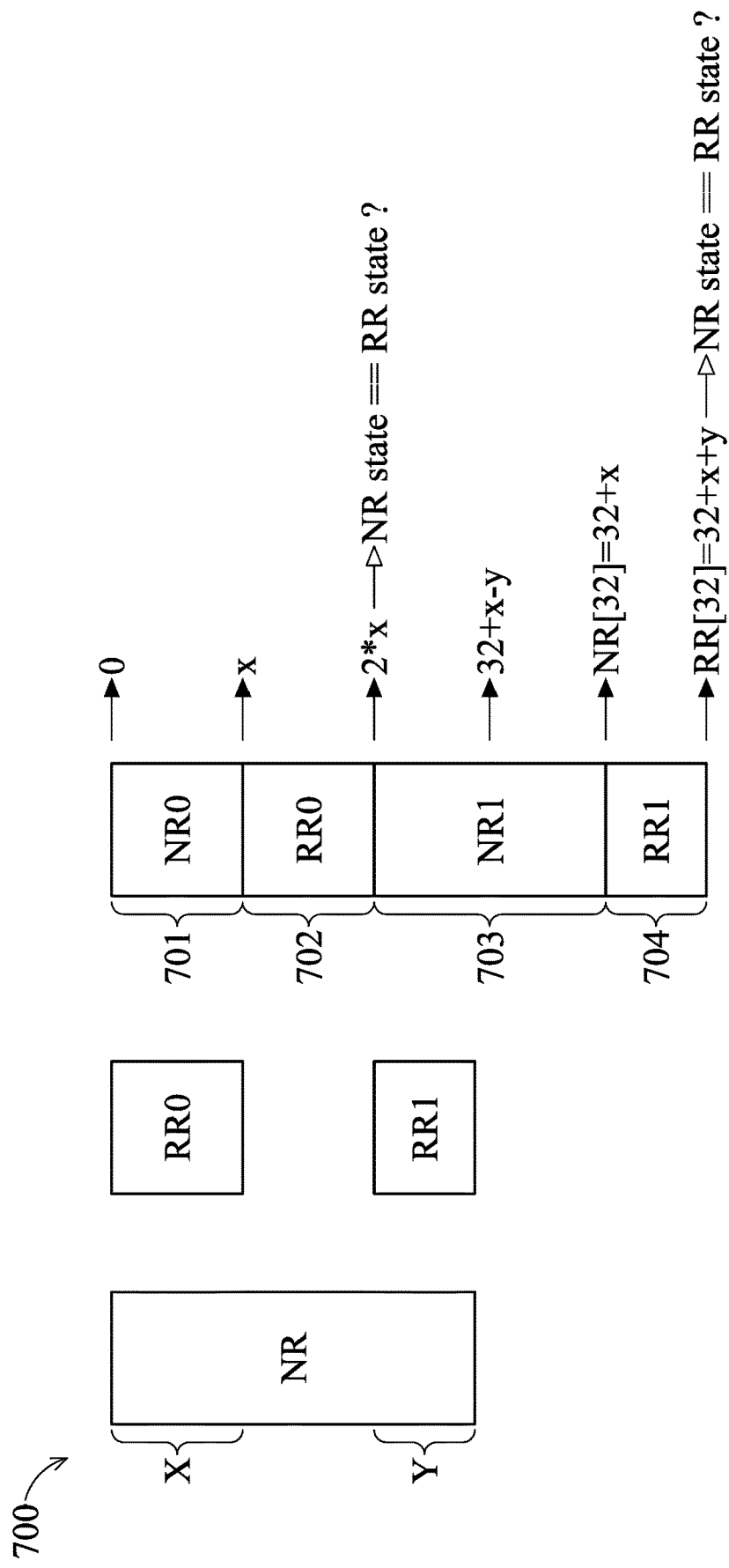
FIG. 7 is a schematic diagram of executing the time-redundant inspection mechanism according to yet another embodiment of the present invention.

FIG. 7 is a schematic diagram of executing the time-redundant inspection mechanism according to yet another embodiment of the present invention. Please refer to FIG. 3 and FIG. 7 at the same time.

In this embodiment, the cipher accelerator 20 sets a first variable x and a second variable y. Assumed that the cipher accelerator 20 uses SM4 block cipher algorithm, the total number of normal rounds NR is 32, and both the first variable x and the second variable y are random integers between 4 and 11, i.e., $4 \leq x$, $y \leq 11$. For example, when the first variable x is greater than or equal to 4, the situation that a novel differential fault analysis method mainly attacks the first 4 rounds of the cryptographic operation can be avoided. When the second variable y is greater than or equal to 4, the situation that most differential fault analysis methods mainly attack the first 4 rounds of the cryptographic operations can be avoided. Also, because the total number of the normal rounds according to SM4 block cipher algorithm is 32, the sum of the first variable x and the second variable y is less than or equal to 32. If the random number generator 140 generates a 3-bit random number, its value will be between 0 and 7, and the range of the first variable x being from 4 to 11 (4+(0~7)=4~11) can be obtained by further considering the limitations of the first variable x and the second variable y, and the range of the second variable y is the same form 4 to 11 (4+(0~7)=4~11). At this moment, the sum of the first variable x and the second variable y is between 8 and 22. If the random number generator 140 generates a random number with more than 3 bits, the cipher accelerator 20 requires additional check circuit (not shown) to check whether the sum of the first variable x and the second variable y exceeds 32 (i.e., the total number of the normal rounds NR according to the SM4 block cipher algorithm), and to notify the random number generator 140 to re-generate the first variable x and the second variable y when the sum exceeds 32. The normal rounds NR in the range 701, for example corresponding to the first clock cycle to the x-th clock cycle, may be referred to as, for example a first normal section NR0. The redundant rounds RR in the range 702, for example corresponding to the (x+1)-th clock cycle to the 2x-th clock cycle, may be referred to as, for example a first redundant section RR0. First, the cipher accelerator 20 sets the cryptographic states of the normal rounds NR and the redundant rounds RR to an initial state, and starts to execute the calculation of the normal rounds NR. When the normal rounds NR are executed to the x-th clock cycle, i.e., the x-th round, the cipher accelerator 20 switches to the cryptographic state of the redundant rounds RR, and then executes the calculation of the redundant rounds RR until the 2x-th clock cycle, and the cipher accelerator 20 will first detect whether the cryptographic states of the first normal section NR0 and the first redundant section RR0 are consistent.

When the cipher accelerator 20 determines that the cryptographic states of the first normal section NR0 and the first redundant section RR0 are inconsistent, the cipher accelerator 20 will end all calculations of the normal rounds NR and the redundant rounds RR, and returns "0" as the cryptographic result. When the cipher accelerator 20 determines that the cryptographic states (for example, the calculation results) of the first normal section NR0 and the first redundant section RR0 are consistent, the cipher accelerator 20 will switch again to the cryptographic state of the normal rounds NR, and executes the calculations of the normal rounds NR until the (32+x−y)-th clock cycle, and the cipher accelerator 20 will copy the cryptographic state of the normal rounds NR to the cryptographic state of the redundant rounds RR, and continues to execute the calculations of the remaining normal rounds NR (i.e., the second normal section NR1). Therefore, the cipher accelerator 20 completes all calculations of the normal rounds NR at the (32+x)-th clock cycle, and switches to the cryptographic state of the redundant rounds RR to continue executing the calculations of the remaining redundant rounds RR. Consequently, the cipher accelerator 20 will complete all calculations of the redundant rounds RR, i.e., the second redundant section RR1, at the (32+x+y)-th cycle, and re-checks whether the cryptographic states of the normal rounds NR and the redundant rounds RR are consistent. The normal rounds NR in the range 703, for example corresponding to the (2x+1)-th clock cycle to the (32+x)-th clock cycle, may be referred to as, for example a second normal section NR1. The redundant rounds RR in the range 704, for example corresponding to the (32+x+1)-th clock cycle to the (32+x+y)-th clock cycle, may be referred to as, for example a second redundant section RR1.

At this moment, when the cipher accelerator 20 determines that the cryptographic states of the normal rounds NR and the redundant rounds RR are inconsistent, the cipher accelerator 20 returns (or reports) "0" as the cryptographic result. When the cipher accelerator 20 determines that the cryptographic states of the normal rounds NR and the redundant rounds RR are consistent, the cipher accelerator 20 returns (or reports) the calculation result of the normal rounds NR.

Please refer FIG. 4 to FIG. 7 together. In FIG. 4, the respective end time of the normal rounds NR and the redundant rounds RR are the 32-th clock cycle and the 64-th clock cycle. For an attacker using the differential fault analysis, if the attacker can create same faults at the 32—the clock cycle and the 64—the clock cycle, then the time-redundant mechanism fails to detect the errors, thus resulting in failure. Moreover, the attacker, who uses the differential fault analysis to effectively find out the cryptographic equation in the chip for attacking the cipher accelerator 20, usually starts attacking at previous several clock cycles before the completion of the cryptographic calculation.

Compared to the conventional time-redundant inspection mechanism 400 of FIG. 4, the redundant rounds RR of the time-redundant inspection mechanism 500 of FIG. 5 ends at the (64−x+y)-th clock cycle (i.e., the total execution time of the cryptographic calculation), and therefore the attacker must guess the end time of the redundant rounds RR (i.e., the first variable x) and the number of the random cycles (i.e., the second variable y). However, the second variable y of the time-redundant inspection mechanism 500 has the opportunity to make the total execution time of the cryptographic calculation exceed 64 clock cycles of the conventional time-redundant inspection mechanism 400, and the end tome of the normal rounds NR of the time-redundant inspection mechanism 500 is fixed, for example the end time NR[32] of the 32-th normal rounds NR is 32 (i.e., the 32-th clock cycle). In addition, the end tome of the redundant rounds RR of the time-redundant inspection mechanism 500 is the (64−x+y)-th clock cycle, and for the attacker it is equivalent to guess just one variable (−x+y). Thus, although the time-redundant inspection mechanism 500 is better in security than the time-redundant inspection mechanism 400, security issues mentioned above still exist.

In the time-redundant inspection mechanism 600 of FIG. 6, the total execution time of the cryptographic calculation is reduced to (64−x) clock cycles, and the attacker must simultaneously guess the end time of the redundant rounds RR (for example, being related to the first variable x) and the end time of the normal rounds NR (for example, being related to the second variable y). Therefore, compared to the time-redundant inspection mechanism 500, the time-redundant inspection mechanism 600 increases the difficulty to attack and reduces the total execution time of the cryptographic calculation. However, for the SM4 block cipher algorithm, when the SM4 cryptographic operation starts, there is weakness of internal collision in the first 4 rounds of SM4 cryptographic operation. Thus, the attacker, who attacks the cipher accelerator 20, may use some novel differential fault analysis methods to utilize the weakness mentioned above and utilize the method of byte-oriented random-failure module to limit the possibility of the SM4 key to $2^{24}$ or $2^{48}$. In the above amount of possibility, the attacker can use method of exhaustion to break and obtain the SM4 key. For the time-redundant inspection mechanisms 500 and 600, they cannot effectively detect/check whether the first 4 rounds of the cryptographic operation malfunction. The conventional time-redundant inspection mechanism can detect whether all rounds malfunction, but its shortcoming is that the end time of the normal rounds NR and the redundant rounds RR are fixed, and the novel differential fault analysis method mentioned above can make same faults in the normal rounds NR and the redundant rounds RR to successfully attack and obtain the key of the cryptographic operation.

The time-redundant inspection mechanism 700 of FIG. 7 adopts double-inspection mechanism to increase the difficulty for the differential fault analysis method, and thus significantly reduces the opportunity of tampering data in the cryptographic operation. For example, if the attacker inserts faults in the first several rounds of the cryptographic operation using similarly the novel differential fault analysis method, then the attacker must first guess out the suspend time of the cryptographic state of the first normal section and the suspend time of the cryptographic state of the first redundant section, for example the x-th clock cycle and 2x-th clock cycle respectively. If the attacker uses the differential fault analysis method and inserts faults in the last several rounds of the cryptographic operation, then the attacker must guess out the suspend time of the cryptographic state of the second normal section and the suspend time of the cryptographic state of the second redundant section, for example the (32+x)-th clock cycle and (32+x+y)-th clock cycle respectively. In other words, the time-redundant inspection mechanism 700 according to the present invention can detect whether unknown faults have occurred in the first several clock cycles after the cryptographic operation starts or the previous several clock cycles before the cryptographic operation ends, so as to increase the difficulty for the differential fault analysis method.

Assumed that the number of the normal rounds NR is 32, the execution time of the time-redundant inspection mechanisms 400~700 are $T_{EXE}$, the beginning time of the first 4 rounds of the normal rounds NR is $T_{NR1-4}$, the beginning time of the first 4 rounds of the redundant rounds RR is $T_{RR1-4}$, the beginning time of the last round of the normal rounds NR is $T_{NR\_last}$, and the beginning time of the last round of the redundant rounds RR is $T_{RR\_last}$, as shown in Table 1.

TABLE 1

| Time-redundant Inspection Mechanism | 400 | 500 | 600 | 700 |
|---|---|---|---|---|
| $T_{EXE}$ | 64 | 64 − x + y | 64 − x | 32 + x + y |
| $T_{NR1-4}$ | 1~4 | 1~4 | 1~4 | 1~4 |
| $T_{RR1-4}$ | 32~36 | Note1 | Note1 | x~x + 4 |

TABLE 1-continued

| Time-redundant Inspection Mechanism | 400 | 500 | 600 | 700 |
|---|---|---|---|---|
| $T_{NR\_last}$ | 32 | 32 | 32 + y | 32 + x |
| $T_{RR\_last}$ | 64 | 64 − x + y | 64 − x | 32 + x + y |

The definitions and ranges of the variables x and y in the time-redundant inspection mechanisms 400~700 can refer to the embodiments of FIG. 4 to FIG. 7, and thus do not repeat the description here. Note 1: when the first variable x is 1, all the first 4 rounds of the redundant rounds RR can be executed.

As shown in table 1, the overall execution time $T_{EXE}$ of the time-redundant inspection mechanism 700 according to the present invention is less than that of the conventional time-redundant inspection mechanism 400, and the overall execution time $T_{EXE}$ is protected by random values (including the first variable x and the second variable y). Also, the beginning time of the last rounds of the normal rounds NR and the redundant rounds RR are protected by the random values (for example, the first variable x, and the first variable x+the second variable y, respectively), and the beginning time of the first 4 rounds of the redundant rounds RR is protected by the random value (for example, the first variable x). Furthermore, the time-redundant inspection mechanism 700 can effectively detect the fault occurrence in the first several clock cycles after the cryptographic operation starts, and the previous several clock cycles before the cryptographic operation ends. Therefore, compared to the conventional time-redundant inspection mechanism 400, or the time-redundant inspection mechanism 500 and 600, the time-redundant inspection mechanism 700 can let the attacker be difficult to make same faults in the first several clock cycles after the cryptographic operation starts, or in the previous several clock cycles before the cryptographic operation ends, so as to reduce the failure possibility of the time-redundant inspection mechanism and thereby increase the security of the cipher accelerator.

Figure 8:
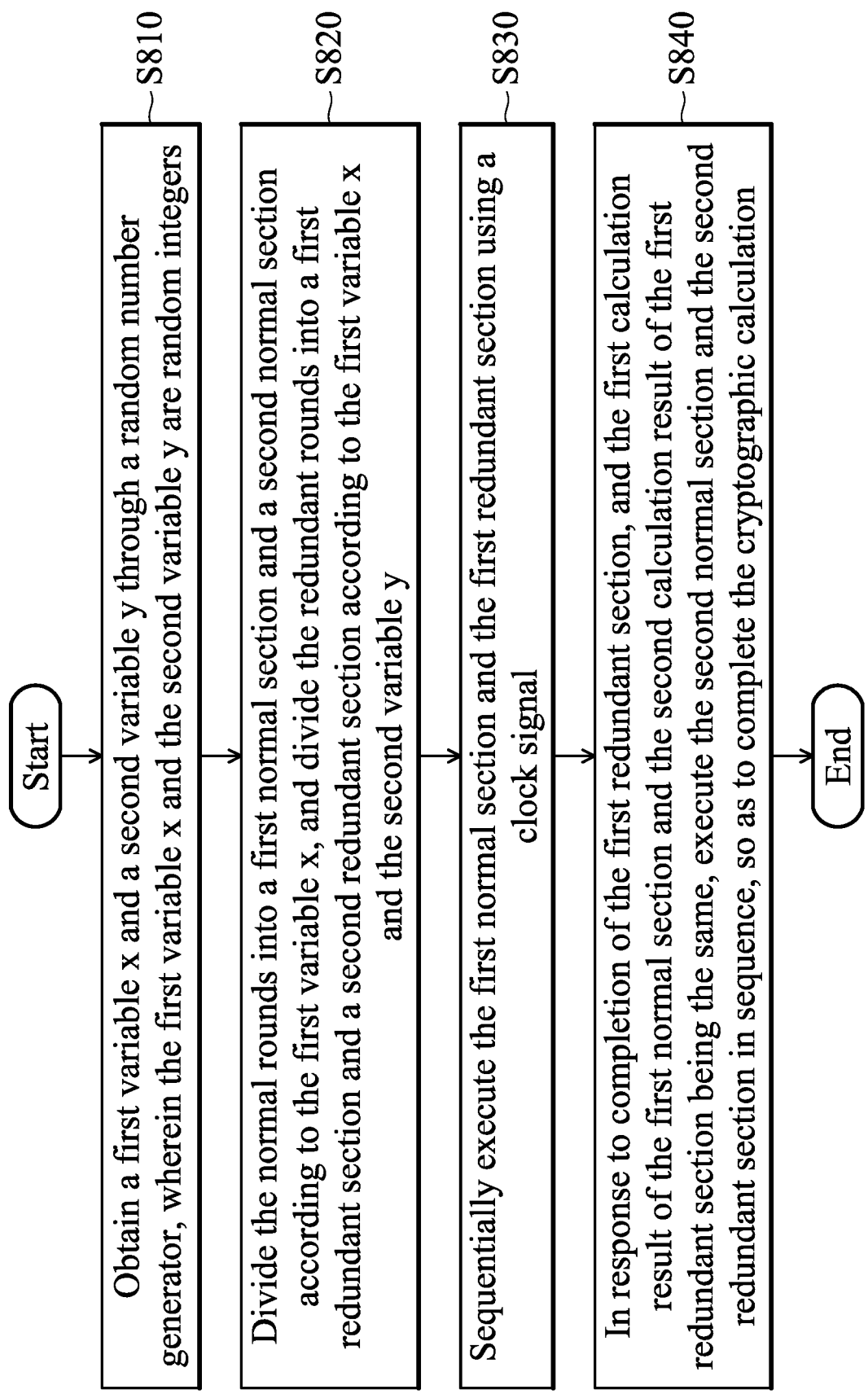
FIG. 8 is a flow chart of a method for tamper protection in cryptographic calculations according to one embodiment of the present invention.

FIG. 8 is a flow chart of a method for tamper protection according to one embodiment of the present invention. Please also refer to FIG. 3, FIG. 7 and FIG. 8.

In step S810, a first variable x and a second variable y are obtained through a random number generator, wherein the first variable x and the second variable y are random integers. In some embodiments, assumed that when the total number of normal rounds NR is 32, the first variable x and the second variable y are random integers between 4 and 11.

In step S820, divide the normal rounds into a first normal section and a second normal section according to the first variable x, and divide the redundant rounds into a first redundant section and a second redundant section according to the first variable x and the second variable y. For example, the ranges 701 and 703 may express the first normal section and the second normal section of the normal rounds NR respectively, and the ranges 702 and 704 may express the first redundant section and the second redundant section of the redundant rounds RR.

In step S830, sequentially execute the first normal section and the first redundant section using a clock signal. For example, the first normal section includes x normal rounds NR, and the first redundant section includes x redundant rounds RR. The cipher accelerator 20 sets the cryptographic states of the normal rounds NR and the redundant rounds RR to an initial state, and starts to execute the calculation of the normal rounds NR. When the normal rounds are executed to the x-th clock cycle (i.e., the x-th round), the cipher accelerator 20 will switch to the cryptographic state of the redundant rounds RR, and then executes the redundant rounds RR until the 2x-th clock cycle.

In step S840, in response to completion of the first redundant section, and the first calculation result of the first normal section and the second calculation result of the first redundant section being the same, the cipher accelerator 20 executes the second normal section and the second redundant section in sequence, so as to complete the cryptographic calculation. For example, in the 2x-th clock cycle, the cipher accelerator 20 has completed the calculation of the first redundant section, and the cipher accelerator 20 will first check whether the cryptographic states of the first normal section and the first redundant section are consistent, for example by comparing the first calculation result of the first normal section and the second calculation result of the first redundant section. When the cipher accelerator 20 determines that the cryptographic states of the normal rounds NR and the redundant rounds RR are inconsistent, the cipher accelerator 20 will ends all calculations of the normal rounds NR and the redundant rounds RR, and returns "0" as the cryptographic result. When the cipher accelerator 20 determines that the cryptographic states (for example, the calculation results) of the normal rounds NR and the redundant rounds RR are consistent, the cipher accelerator 20 will switch again to the cryptographic state of the normal rounds NR, and executes the calculation of the normal rounds NR until the (32+x−y)-th clock cycle, and then the cipher accelerator 20 will copy the cryptographic state of the normal rounds NR to the cryptographic state of the redundant rounds RR and continues to execute the calculation of the remaining normal rounds NR (i.e., the second normal section). Therefore, the cipher accelerator 20 will complete the calculation of all normal rounds NR in the (32+x)-th clock cycle and switch to the cryptographic state of the redundant rounds RR so as to continue executing the calculation of the remaining redundant rounds RR (i.e., the second redundant section). Consequently, the cipher accelerator 20 will complete the calculation of all redundant rounds RR in the (32+x+y)-th clock cycle.

Note that when the cipher accelerator 20 completes the calculations of the second normal section and the second redundant section, the cipher accelerator 20 will detect again whether the cryptographic states of the normal rounds NR and the redundant rounds RR are consistent, for example by comparing the third calculation result of the second normal section and the fourth calculation result of the second redundant section. At this moment, when the cipher accelerator 20 determines that the cryptographic states of the normal rounds NR and the redundant rounds RR are inconsistent, the cipher accelerator 20 will return "0" as the cryptographic result. When the cipher accelerator 20 determines that the cryptographic states of the normal rounds NR and the redundant rounds RR are consistent, the cipher accelerator 20 will return the calculation result of the normal rounds NR.

In summary, the present invention discloses a cipher accelerator and a method for tamper protection in cryptographic operations, which can adopt double-inspection mechanism to improve the difficulty for the differential fault analysis method, and reduces the overall execution time of the cryptographic operation, and effectively detects fault occurrence in the first several clock cycles after the cryptographic operation starts and in the previous several clock cycles before the cryptographic operation ends, so as to reduce the failure probability of the time-redundant inspection mechanism and increase the security of the cipher accelerator.

Although preferred embodiments of the present invention have been described in detail, the present invention is not limited to specific embodiments, and various modifications and variations can be made within the spirit and scope of the invention described in the claims. Therefore, the scope for protecting the present invention should be defined according to the scope of the appended claims.

What is claimed is:

1. A cipher accelerator, comprising:
a cryptographic circuit, configured to execute a cryptographic calculation according to a control signal; wherein the cryptographic calculation includes a plurality of normal rounds and a plurality of redundant rounds;
a controller, configured to provide the control signal to the cryptographic circuit, according to a first variable x and a second variable y, to control the sequence in which the cryptographic circuit executes the plurality of normal rounds and the plurality of redundant rounds; wherein the first variable x and the second variable y are positive integers;
a first memory, configured to store a state of execution of the plurality of normal rounds; and
a second memory, configured to store a state of execution of the plurality of redundant rounds;
wherein the cryptographic circuit divides the plurality of normal rounds into a first normal section and a second normal section according to the first variable x, and divides the plurality of redundant rounds into a first redundant section and a second redundant section according to the first variable x and the second variable y;
wherein the cryptographic circuit executes in sequence the first normal section and the first redundant section using a clock signal;
wherein in response to completion of the first redundant section, and a first calculation result of the first normal section and a second calculation result of the first redundant section being the same, the cryptographic circuit executes the second normal section and the second redundant section in sequence to complete the cryptographic calculation.

2. The cipher accelerator as claimed in claim 1, wherein an end time of the first normal section is the x-th clock cycle of the clock signal, and an end time of the first redundant section is the 2x-th clock cycle of the clock signal.

3. The cipher accelerator as claimed in claim 1, wherein there is a first amount z of the plurality of normal rounds, and an end time of the plurality of normal rounds is the (z+x)-th clock cycle of the clock signal, and an end time of the plurality of redundant rounds is the (z+x+y)-th clock cycle of the clock signal, and the first amount z is a positive integer.

4. The cipher accelerator as claimed in claim 1, wherein in response to the cryptographic circuit completing the second redundant section, the cryptographic circuit determines whether a third calculation result of the second normal section is the same as a fourth calculation result of the second redundant section.

5. The cipher accelerator as claimed in claim 4, wherein in response to the cryptographic circuit determining that the third calculation result of the second normal section is the same as the fourth calculation result of the second redundant section, the cryptographic circuit determines that the cryptographic calculation is successful, and reports the third calculation result as a cryptographic result of the cryptographic calculation;
wherein in response to the cryptographic circuit determining that the third calculation result of the second normal section is different from the fourth calculation result of the second redundant section, the cryptographic circuit clears the cryptographic result of the cryptographic calculation and resets the cryptographic result of the cryptographic calculation to 0.

6. A method for tamper protection in cryptographic calculations, wherein a cryptographic calculation includes a plurality of normal rounds and a plurality of redundant rounds, the method comprising:
using a random number generator to obtain a first variable x and a second variable y, wherein the first variable x and the second variable y are positive integers;
dividing the plurality of normal rounds into a first normal section and a second normal section according to the first variable x, and dividing the plurality of redundant rounds into a first redundant section and a second redundant section according to the first variable x and the second variable y;
executing in sequence the first normal section and the first redundant section using a clock signal; and
in response to completion of the first redundant section, and a first calculation result of the first normal section and a second calculation result of the first redundant section being the same, executing the second normal section and the second redundant section in sequence to complete the cryptographic calculation.

7. The method as claimed in claim 6, wherein
an end time of the first normal section is the x-th clock cycle of the clock signal, and an end time of the first redundant section is the 2x-th clock cycle of the clock signal.

8. The method as claimed in claim 6, wherein
there is a first amount z of the plurality of normal rounds, and an end time of the plurality of normal rounds is the (z+x)-th clock cycle of the clock signal, and an end time of the plurality of redundant rounds is the (z+x+y)-th clock cycle of the clock signal, wherein the first amount z is a positive integer.

9. The method as claimed in claim 6, further comprising:
in response to the completion of the second redundant section, determining whether a third calculation result of the second normal section is the same as a fourth calculation result of the second redundant section.

10. The method as claimed in claim 9, further comprising:
in response to the third calculation result of the second normal section being the same as the fourth calculation result of the second redundant section, determining that the cryptographic calculation was successful, and reporting the third calculation result as a cryptographic result of the cryptographic calculation; and
in response to the third calculation result of the second normal section being different from the fourth calculation result of the second redundant section, clearing the cryptographic result of the cryptographic calculation and resetting the cryptographic result of the cryptographic calculation to 0.

* * * * *